United States Patent
Voss et al.

(10) Patent No.: US 8,135,954 B2
(45) Date of Patent: Mar. 13, 2012

(54) DISTRIBUTED DIGITAL SIGNATURE GENERATION

(75) Inventors: Joel D. Voss, Elkhorn, WI (US); Ronald F. Buskey, Loves Park, IL (US); Joseph M. Hansen, Williams Bay, WI (US); David H. Hartley, Seacombe Heights (AU); Michael J. Terrington, Highbury (AU)

(73) Assignee: Motorola Mobility, Inc., Libertyville, IL (US)

( * ) Notice: Subject to any disclaimer, the term of this patent is extended or adjusted under 35 U.S.C. 154(b) by 1058 days.

(21) Appl. No.: 11/017,259

(22) Filed: Dec. 20, 2004

(65) Prior Publication Data

US 2006/0136727 A1 Jun. 22, 2006

(51) Int. Cl.
*G06F 21/00* (2006.01)

(52) U.S. Cl. ........ 713/175; 713/156; 713/182; 713/183; 380/30; 380/283; 380/285; 380/286

(58) Field of Classification Search .................. 713/156, 713/175–176, 182, 183; 380/286, 30, 283, 380/285

See application file for complete search history.

(56) References Cited

U.S. PATENT DOCUMENTS

| | | | |
|---|---|---|---|
| 5,208,858 A | | 5/1993 | Vollert et al. |
| 5,398,285 A | * | 3/1995 | Borgelt et al. ................. 380/30 |
| 6,023,509 A | * | 2/2000 | Herbert et al. ................. 705/76 |
| 6,223,291 B1 | * | 4/2001 | Puhl et al. ........................ 726/28 |
| 6,675,296 B1 | * | 1/2004 | Boeyen et al. ................ 713/156 |
| 6,959,382 B1 | * | 10/2005 | Kinnis et al. .................. 713/170 |
| 7,080,039 B1 | * | 7/2006 | Marsh .............................. 705/51 |
| 2002/0129257 A1 | | 9/2002 | Parmelee et al. |
| 2003/0079133 A1 | * | 4/2003 | Breiter et al. ................. 713/182 |
| 2004/0001594 A1 | * | 1/2004 | Krishnaswamy et al. .... 380/277 |
| 2004/0167859 A1 | * | 8/2004 | Mirabella ........................ 705/59 |
| 2004/0181672 A1 | * | 9/2004 | Ferri et al. ..................... 713/176 |
| 2005/0152542 A1 | * | 7/2005 | Zheng et al. .................... 380/30 |
| 2005/0257045 A1 | * | 11/2005 | Bushman et al. ............. 713/156 |
| 2006/0064756 A1 | * | 3/2006 | Ebert ............................... 726/26 |

FOREIGN PATENT DOCUMENTS

| WO | WO 01/13574 A1 | 2/2001 |
|---|---|---|
| WO | WO 02/86683 A2 | 4/2002 |

* cited by examiner

*Primary Examiner* — Christian Laforgia
*Assistant Examiner* — Kari Schmidt

(57) ABSTRACT

A server, e.g., a client (105, 107, 109), receives a request for a digital signature to be applied to digital information, obtains a representation of the information, determines a designation of key pair(s) to be applied thereto; and transmits a request for the digital signature to a front end server (103a, 103b). The front end server determines one or more of whether the client is authentic and authorized, the user identifier is authentic, and the user identifier is permitted to make the request. If so, the front end server transmits a request to generate a digital signature to a back end server (101). The back end server determines one or more of whether the front end server is authentic and the designated key pair correspond to the requesting front end server. If so, the back end server generates the digital signature based on the information and the key pair(s).

20 Claims, 8 Drawing Sheets

US 8,135,954 B2

DISTRIBUTED DIGITAL SIGNATURE GENERATION

FIELD OF THE INVENTION

The present invention relates in general to security of digital information, and more specifically to providing a digital signature for use in connection with digital information.

BACKGROUND OF THE INVENTION

Digital information can be provided with a digital signature, in order to attest to the integrity of the digital information. To provide a digital signature, a conventional digital signature technique generates a digital signature corresponding to a particular document, software, or other digital information, by using a private key. A recipient of the digital information with the digital signature can check the digital signature against a public key to determine whether the digital signature is valid. In addition, the digital signature may assist in detection of any alteration of the digital information which occurred.

Digital signatures can be relied on by various processes, such as secure boot loaders, run time security checks, and secure install functions. For example, before allowing software to be installed or executed on a processor, the digital signature can be checked in order to authenticate and validate the software.

A particular private key and a corresponding public key are referred to as a "key pair". The public key can be provided to as many users as desired, so that a particular digital signature can be verified. The corresponding private key to be utilized in creating the digital signature is kept private. Hence, maintaining confidentiality of the private key is imperative for maintaining integrity.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
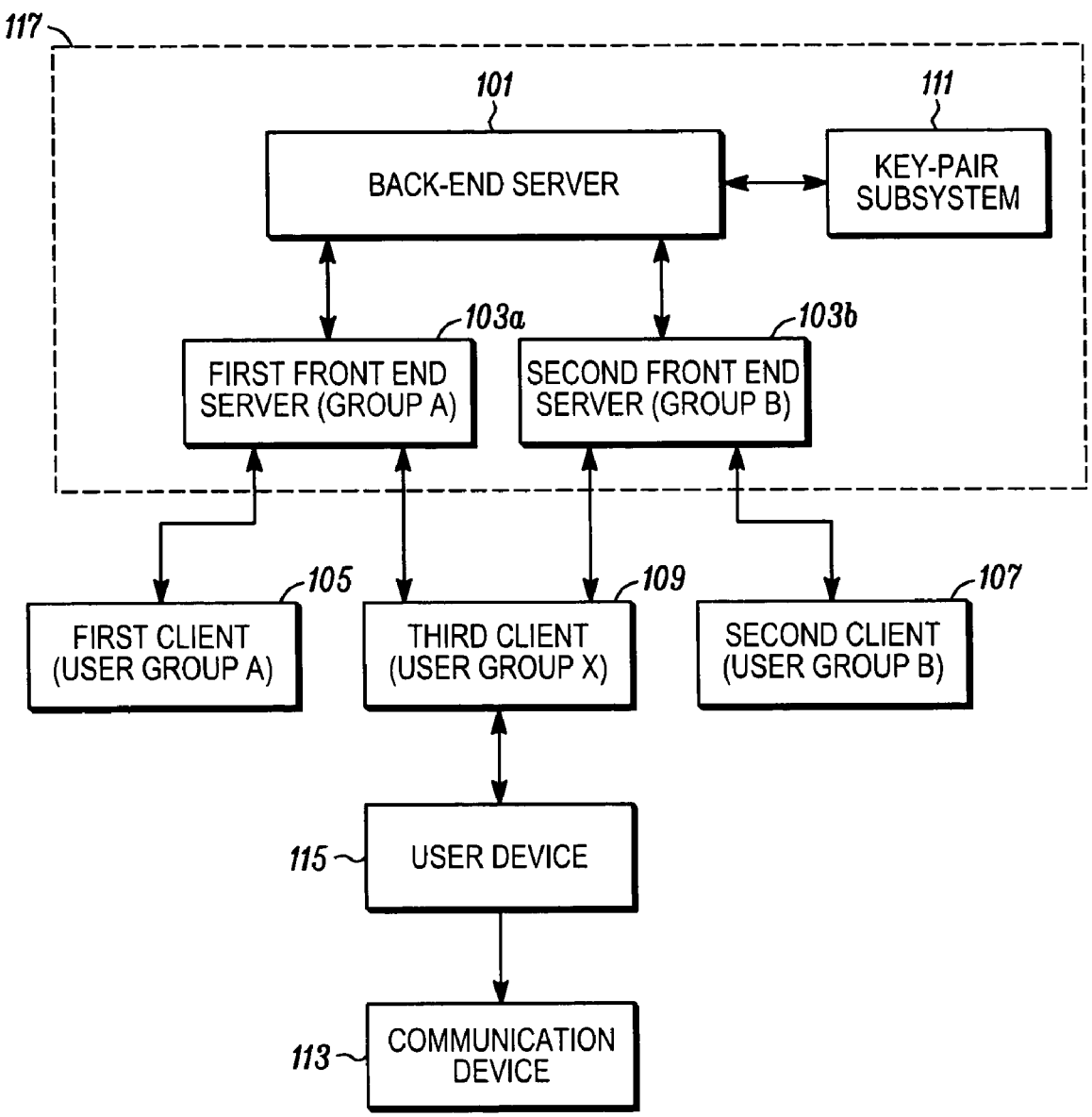
FIG. 1 is a diagram illustrating a simplified and representative environment associated with a method and system for distributed digital signature generation in accordance with various exemplary embodiments.

In overview, the present disclosure relates to devices that can have digital information, e.g., software and/or data, loaded thereon. Such devices can include, for example, computers, and wireless communications devices or units, often referred to as communication units, such as cellular phones, two-way radios, or the like that have an ability to have software loaded thereon either via a hard connection or over the air. Such devices can be associated with a communication system such as an Enterprise Network, a cellular Radio Access Network, or the like. Such communication systems may further provide services such as voice and data communications services. More particularly, various inventive concepts and principles are embodied in systems and methods therein for generating a digital signature to be associated with software that can be loaded onto such a device.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As further discussed herein below, various inventive principles and combinations thereof are advantageously employed to provide digital signatures in a distributed fashion, e.g., for multiple groups in multiple locations. Moreover, one or more embodiments can provide a secure, centralized storage of private keys while at the same time granting authority to generate digital signatures to a widely distributed user base. In addition, one or more embodiments can accommodate secure storage of private keys between different groups of users without allowing the different groups to generate digital signatures for each other's digital information. Further, one or more embodiments can support restricted digital signature authority for mass production software, while at the same time granting a more relaxed digital signature authority for restricted distribution software.

By way of background, a digital signature can be generated in accordance with known techniques, for example, by hashing at least a portion of the digital information (sometimes referred to as a message digest), and then encrypting the message digest with the private key. The resulting digital signature can be appended or otherwise associated with the digital information. The digital information, now with digital signature, can be passed on, and the digital signature can be decrypted with the public key in accordance with well known techniques.

Confidentiality of a private key can be ensured by limiting use of the private key to a restricted set of authorized users. However, digital signatures can be legitimately required for multiple groups in multiple locations. In addition, multiple versions of software can each require digital signatures. Some versions of software, although requiring a digital signature, may not be intended for general availability, e.g., debug and field test versions.

Further in accordance with exemplary embodiments, there is provided a key pair generation subsystem that generates key pairs, each key pair comprising at least a public key and a private key, which can be used to generate and validate a digital signature. One or more embodiments can provide for storage of the private key, advantageously in a secure manner, for use during the generation of the digital signatures. Moreover, one or more embodiments can utilize the private key to generate digital signatures as required, further described in detail below in connection with FIG. 1-FIG. 8.

Referring now to FIG. 1, a diagram illustrating a simplified and representative environment associated with a method and system for distributed digital signature generation in accordance with various exemplary embodiments will be discussed and described. The illustrated example provides a back end server 101 communicating with front end servers, represented in this example by a first front end server (corresponding to user group A) 103a and a second front end server (corresponding to user group B) 103b. The front end servers can communicate with various clients, e.g., a first client (corresponding to user group A) 105, a second client (corresponding to user group B) 107, and a third client (corresponding to user group X) 109.

A user device 115 can communicate with the client, e.g., the illustrated third client 109 to obtain a digital signature to be applied to digital information. Alternatively, a user can utilize the client itself to obtain the digital signature. The user device 115 then can provide the digital information with the digital signature to a device, e.g., a communication device 113. For the sake of simplicity, this is illustrated as a direct transmission from the user device 115 to the communication device 113, although it will be appreciated that the digitally signed digital information can be distributed to communication devices directly or indirectly in a number of ways, e.g., over the Internet, over the air, from another user, etc.

The back end server 101 can communicate with a key pair subsystem 111. Although the key pair subsystem 111 is illustrated here as a separate system, various alternative embodiments can include the key pair subsystem as a portion of the back end server 101, and/or the key pair subsystem 111 can itself be comprised of multiple systems. In the present illustration, the back end server, the front end servers 103a, 103b, and the key pair subsystem 111 are physically co-located within a secure perimeter 117.

Access to the private key itself can be securely limited, e.g., to the back end server 101, while at the same time flexible access can be provided to users that may have legitimate need to generate digital signatures, e.g., via the clients 105, 107, 109. A user on a user device 115, e.g., in a distributed location, can make a signature request to the key pair subsystem via one of the clients 105, 107, 109 in such a way that a digital signature can be generated without the user having direct access to the private key.

In order to illustrate the ability of one or more embodiments to provide distributed digital signature generation, assume that the users of a system can be divided into user groups, e.g., user group A, user group B, and user group X. Each key pair can be owned by a single user group, although a single user group can own multiple key pairs. However, in operation, it is not necessary for all user groups to own key pairs.

Each user group can comprise as many unique users as desired. Also, a particular user can be included in more than one user group, if desired.

Advantageously, one back end server 101 is provided, although it will be appreciated that the functions provided on the back end server can be distributed among several servers. The back end server can incorporate, or as illustrated, can have access to the key pair subsystem 111 in which key pairs are generated and private keys can be stored. The back end server can be utilized in order to generate digital signatures for the key pairs in the key pair subsystem 111.

The back end server 101 can have access to information identifying a user group owning each key pair. This information can be stored in accordance with known techniques, e.g., as a table of key pairs and corresponding user groups. Advantageously, the back end server 101 can have severely restricted access, both physically and also from the computer network, in order to protect the sensitive private keys. For example, the back end server 101 can be on a dedicated computer isolated in a physically secure room with a single network connection and a firewall allowing access only on designated ports from designated front end servers 103a, 103b.

There can be provided one or more front end servers 103a, 103b associated with the back end server 101. A front end server can be associated with one or more designated user groups. In this example, the first front end server 103a is associated with user group A, and the second front end server 103b is associated with user group B.

A particular front end server can hold information which allows it to recognize clients 105, 107, 109 that are authorized to access the front end server. There can be multiple clients 105, 107, 109 associated with a particular front end server 103a, 103b. For example, the first front end server 103a can have information listing authorized clients including the first client (corresponding to user group A) 105 and the third client (corresponding to user group X); and the second front end server 103b can have information listing authorized clients including the second client (corresponding to user group B) 107 and the third client (corresponding to user group X).

According to various embodiments, a particular front end server can hold information identifying which users belonging to a user group are authorized to request a given signature request type (e.g., mass production or restricted distribution) corresponding to the one or more key pairs that belong to the user group associated with the front end server. Advantageously, users are restricted from modifying the user group association of the front end servers.

The front end servers 103a, 103b advantageously can have restricted access in order to protect the authorization information they contain, and further to protect the access to the back end server 101. For example, the front end servers 103a, 103b can run together on a single computer in the same secure room as a computer on which the back end server 101 runs, with a firewall protecting the front end servers from access from an external computer network. As an alternative example, the front end servers 103a, 103b can run on the same computer as the back end server 101.

One or more of the clients 105, 107, 109 can request a digital signature for digital information to which it has access, e.g., through local storage or over a networked connection. In accordance with one or more embodiments, a client can be operated by a user, or as illustrated, the client 109 can be operated by a user device 115.

The client 105, 107, 109 can hold information allowing it to identify itself to the front end server 103a, 103b. The client 105, 107, 109 can be provided so that it does not restrict access to users, however, a connection between the client 105, 107, 109 and the front end servers 103*a*, 103*b* can be protected to provide communication integrity (for example, by the front end server authenticating itself in accordance with known techniques).

In accordance with alternative embodiments, there can be two or more types of signature requests that can be handled by one or more embodiments: a type of signature request corresponding to digital information for mass production software (e.g., software for multiple communication devices) and a type of signature request for restricted distribution software (e.g., software for a particular communication device). Mass production software is intended to be distributed to more than one device, e.g., for distribution to all devices of a particular model type. Restricted distribution software, on the other hand, is intended to be distributed only to a particular device, and may incorporate, e.g., a unique identifier for the particular device.

One or more embodiments can provide user authorization checks on the front end servers 103*a*, 103*b*. An access control list of authorization information (e.g., a user identifier authorized for a user within a particular user group, an authorized signature request type, and/or an authorized key pair) can be provided on the front end server 103*a*, 103*b*. A signature request can be checked against the access control list to determine whether it matches an entry from this list; if so, the signature request passes the user authorization check. Note that the example embodiment of the user authorization check does not require the user to belong to the front end server's designated user group. Accordingly, by being listed in the access control list, a user from another user group (including a user group with no key pair of its own) can be given signature authority.

In accordance with one or more embodiments, users from the front end server's designated user group (e.g., users on the first client 105 for the first front end server 103*a*) can be authorized to make restricted distribution signature requests with any key pair associated with the client and/or the front end server, even if there is no match in the access control list. This can reduce the size of the access control list and the effort required to maintain it.

Figure 2:
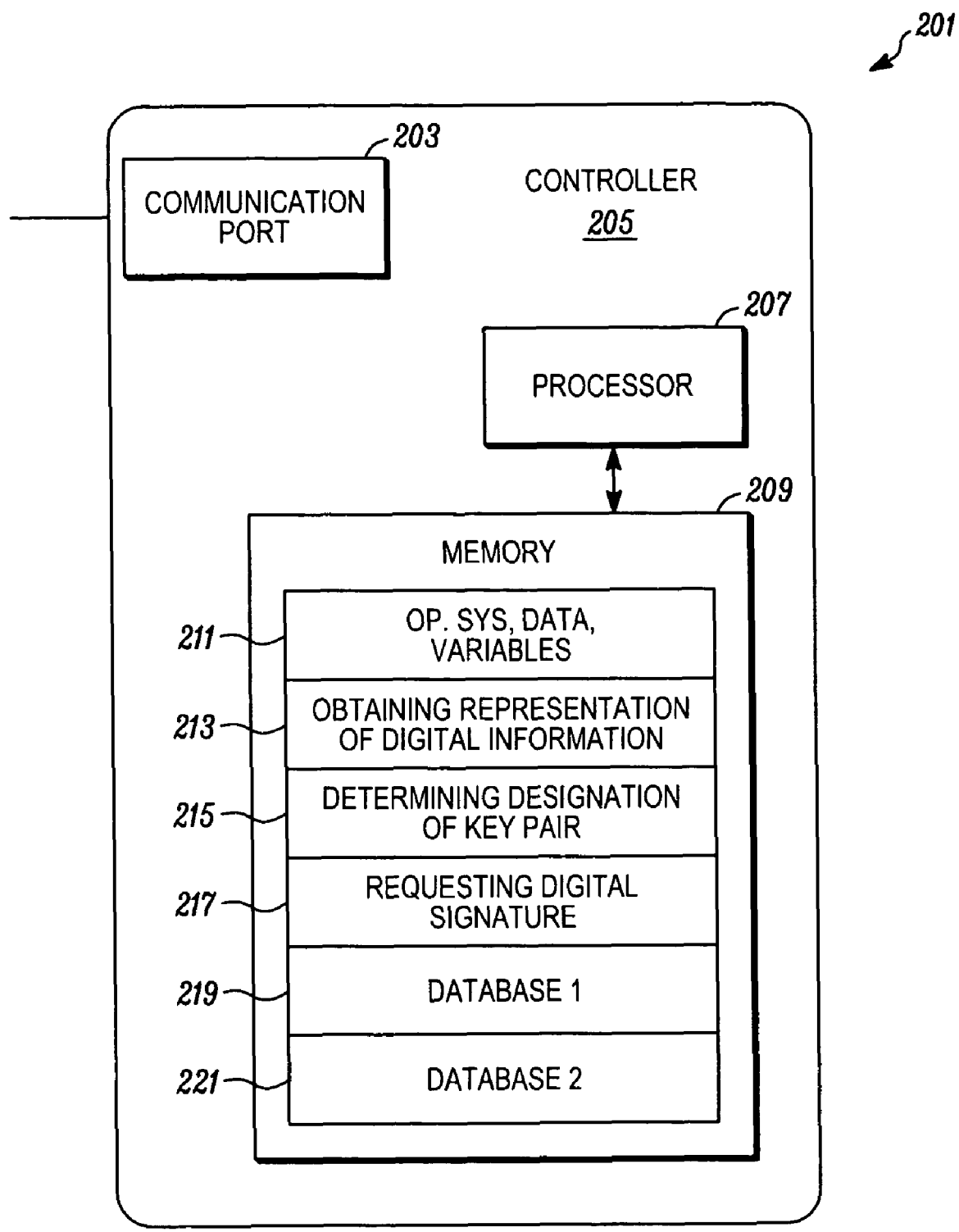
FIG. 2 is a diagram illustrating portions of an exemplary client server in accordance with various exemplary embodiments.

Referring now to FIG. 2, a diagram illustrating portions of an exemplary client server in accordance with various exemplary embodiments will be discussed and described. The client 201 may include one or more controllers 205. A controller 205 may include a communication port 203 for communication over a communication network, a processor 207, a memory 209, and optionally a user input device such as a keyboard (not illustrated).

The processor 207 may comprise one or more microprocessors and/or one or more digital signal processors. The memory 209 may be coupled to the processor 207 and may comprise a read-only memory (ROM), a random-access memory (RAM), a programmable ROM (PROM), an electrically erasable read-only memory (EEPROM), magnetic memory and/or the like. The memory 209 may include multiple memory locations for storing, among others, an operating system, data and variables 211 for programs executed by the processor 207; computer programs for causing the processor to operate in connection with various functions such as obtaining representations of digital information 213, determining a designation of a key pair 215, requesting a digital signature 217, and/or other processing; a database 219 of various information such as public keys; and a database 221 for other information used by the processor 207. The computer programs may be stored, for example, in ROM, PROM, etc. and may direct the processor 207 in controlling the operation of the controller 205.

Responsive to signaling, e.g., from the user input device, in accordance with instructions stored in memory 209, or automatically upon receipt of certain information via the communication port 203, the processor 207 may direct/process the received information. A display (not illustrated) may present information to a user of the client (directly or indirectly) by way of a conventional liquid crystal display (LCD) or other visual display.

The processor 207 can be configured to facilitate, in response to a first request, the first request being for a digital signature to be applied to digital information and including a user identifier, obtaining a representation of the digital information to be used in determining the digital signature.

The digital information can be determined, for example, by retrieving a pointer or a file name from the first request to obtain the digital information. Furthermore, the processor can provide the representation of the digital information, e.g., a hashed representation or a message digest of the digital data (or a portion thereof) in accordance with known techniques, to be utilized as the representation of the digital information. The user identifier can be provided in any appropriate way, for example, a unique user indication and a corresponding password.

The first request can provide one key pair, or more than one key pair, as would be appropriate, for example, where the key pairs are in a hierarchy of key pairs. (It is understood that some digital information may include multiple digital signatures.) The processor 207 can be configured to facilitate determining a designation of one or more key pairs to be applied to the digital information. The first request can optionally include a designation of a key pair, e.g., by public key, by data corresponding to the public key, or by default corresponding to the user, user group or client. The processor 207 can be configured to facilitate transmitting a second request, the second request being for a digital signature and including at least the representation, the key pair or key pairs, and the user identifier.

Further, the processor 207 can be configured to facilitate determining, responsive to the one or more key pairs, a recipient of the second request, wherein the second request is transmitted to the recipient. For example, the client may send all digital signature requests to a particular front end server, particularly where the front end server corresponds to the user group associated with the client. As another example, the client may determine to send requests for key pairs normally associated with user group A to the front end server associated with group A; and requests for key pairs normally associated with user group B to the front end server associated with group B. The processor 207 can have access to information, e.g., in one of the data bases 219, 221 associating particular key pairs with particular front end servers.

Optionally, the processor can be configured to facilitate operably coupling to the recipient, and proceeding to authenticate itself to the recipient. Techniques for providing authentication are known, e.g., for a client to authenticate itself to a server.

Optionally, the digital signature can be intended to correspond to a particular device, or to multiple devices, for reasons including for example those provided above. Therefore, one or more embodiments provides that the second request can indicate at least a first signature request type indicating that it corresponds to a particular device, and the second request can include an identification corresponding to the particular device. Similarly, the second request can indicate at least a second signature request type corresponding to a plurality of devices.

Figure 3:
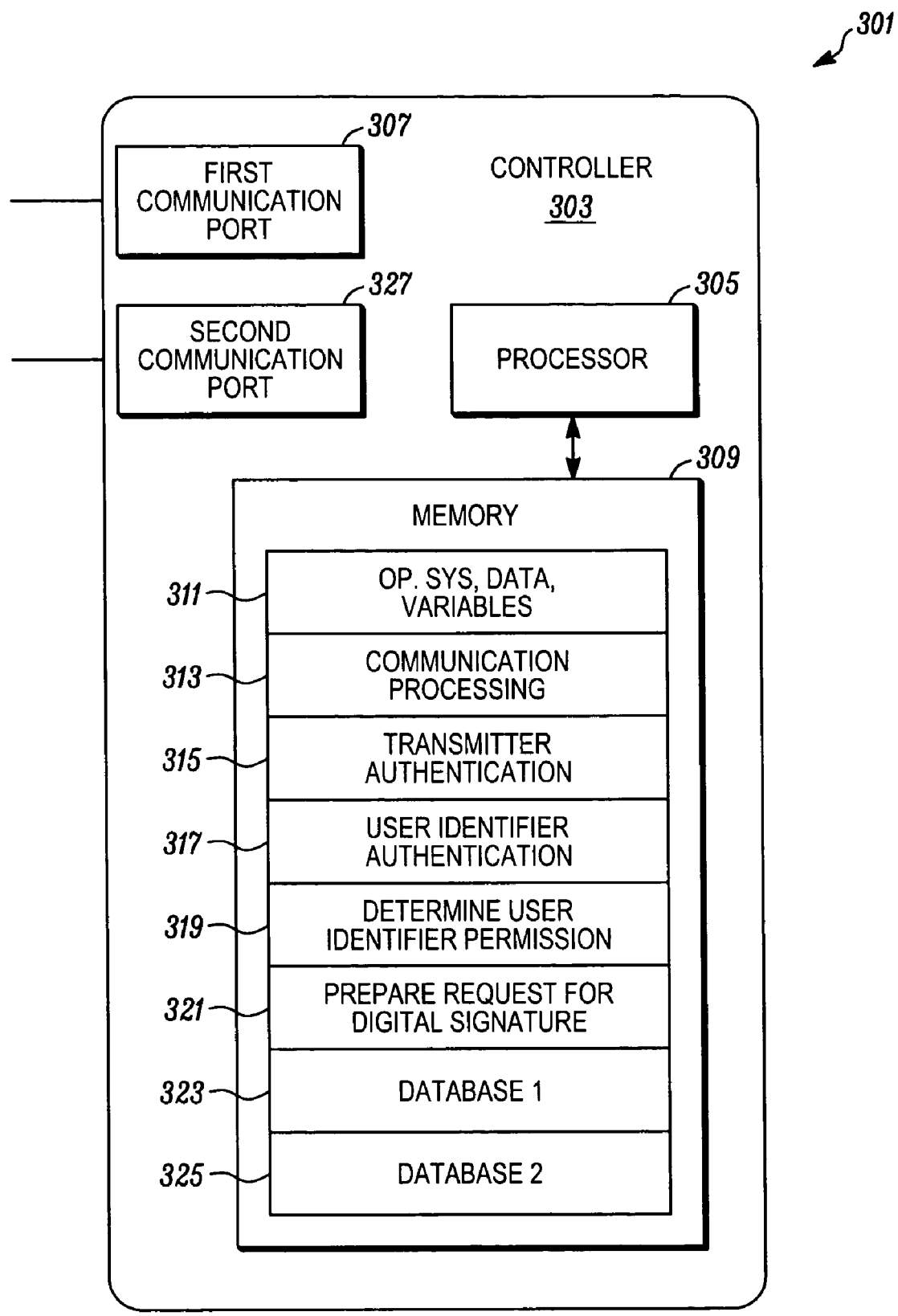
FIG. 3 is a block diagram illustrating portions of an exemplary front end server in accordance with various exemplary embodiments.

Referring now to FIG. 3, a block diagram illustrating portions of an exemplary front end server in accordance with various exemplary embodiments will be discussed and described. The front end server 301 may include one or more controllers 303. A controller 303 may include one or more first communication ports 307 for communication over a communication network, one or more second communication ports 327 for communication over a communication network, a processor 305, and a memory 309. Other components may be provided as will be understood by one of skill and are hence not described herein. If desired, one of the first and second communication ports 307, 327 can be provided over a secure communication network, e.g., to provide a more secure connection to a back end server.

The processor 305 may comprise one or more microprocessors and/or one or more digital signal processors. The memory 309 can be coupled to the processor 305 and may comprise a read-only memory (ROM), a random-access memory (RAM), a programmable ROM (PROM), an electrically erasable read-only memory (EEPROM), magnetic or optical memory, and/or the like. The memory 309 can include multiple memory locations for storing, among others an operating system, data and variables 311 for programs executed by the processor 305; computer programs for causing the processor to operate in connection with various functions such as communication processing 313, transmitter authentication 315, user identifier authentication 317, determining user identifier permission 319, preparing requests for digital signature 321, and/or other processing; a database 323 of various information such as user identifiers; and a database 325 for other information used by the processor 207. The computer programs can direct the processor 305 in controlling the operation of the controller 303.

Responsive to signaling, e.g., in accordance with instructions stored in memory 309, or automatically upon receipt of certain information via the first or second communication ports 307, 327, the processor 305 may direct/process the received information. For example, the processor 305 can be configured to facilitate receiving, e.g., over one of the communication ports 307, 327, a first request for a digital signature. Advantageously, the first request is received from one of the clients. The first request can include, e.g., a user identifier, a representation of digital information to be used in determining the digital signature, and a designation of at least one key pair to be applied to the digital information. User identifiers, representations of digital information, and designation(s) of key pair(s) have been previously discussed.

Having received the first request, the processor 305 can perform various authentications and/or other checks to determine whether or not the request is valid and authorized. For example, responsive to the first request, the processor 305 can provide first determining whether the transmitter of the first request is authentic and is authorized to send the first request; second determining whether the user identifier is authentic; and/or third determining whether the user identifier is permitted to make the first request. The transmitter can be determined to be authentic and authorized by checking the identity of the transmitter, e.g., the client, against a list of approved transmitters. Further, whether the user identifier is authentic can be determined, for example, by checking the user identity with a password. Further, whether the user identifier is permitted to make the first request can be determined, for example, by checking the identity of the user, or of the group with which the user is associated, against a list of key pairs for which the user or the group can request digital signatures.

If the various authentications and verifications are passed, the processor 305 can transmit the request to the back end server, so that the back end server can generate the digital signature. Accordingly, in response to the first, second and third determining, the processor 305 can be configured to facilitate transmitting a second request to a device for generating a digital signature, the request including the representation and the designation noted above.

The user identifier that is included in the first request can be one of many user identifiers permitted to make the request. Where the request comes from a user corresponding to a group that owns the indicated key pair, one or more embodiments can assume that the user identifier is permitted to utilize the requested key pairs. (The foregoing determination of the authenticity of the transmitter and determination of the authenticity of the user identifier advantageously are still made.) The assumed permission can be limited to a type of signature request, e.g., a request for restricted distribution software.

According to one or more embodiments, the first request can indicate at least a second signature request type corresponding to many devices. For example, the request can be to generate a digital signature to be utilized for mass distribution, as discussed above.

One or more embodiments provide that a particular client is permitted to request digital signatures for one or more key pairs. Accordingly, the first request further can indicate one of several pre-determined client identifiers associated with permitted requestors of digital signatures. Where the request comes from a trusted client, it can be assumed that the client identifier is a permitted requestor of the digital signature corresponding to the indicated key pair(s).

The processor 305 can be configured to facilitate not transmitting the second request, responsive to a failure of at least one of the first, second and third determining processes. If desired, other error handling, logging, and/or alerting can be provided by the processor 305.

The processor 305 can be further configured to facilitate maintaining a list of corresponding user identifiers including the user identifier and key pairs including the at least one key pair. The determinations that are made by the processor 305 can refer to the various lists. Accordingly, one or more of the first, second and third determining actions can utilize the list.

The processor 305 can be provided with first and/or second communication ports 307, 327 on a communication network, in order to communicate with, e.g., the clients transmitting the requests for digital signatures and the device providing the digital signatures, e.g., the back end server. There can be provided a transceiver (e.g., the first communication port 307) for transmitting and receiving messages to the transmitter when operably coupled to a communication network in accordance with a secure connection. Also, there can be provided another transceiver (e.g., the second communication port 327) for transmitting and receiving message to the device when operably coupled to the device. As explained above, the communications between the front end server and the back end server can advantageously be provided on a secure communication link, where the servers can be verified physically or logically.

Figure 4:
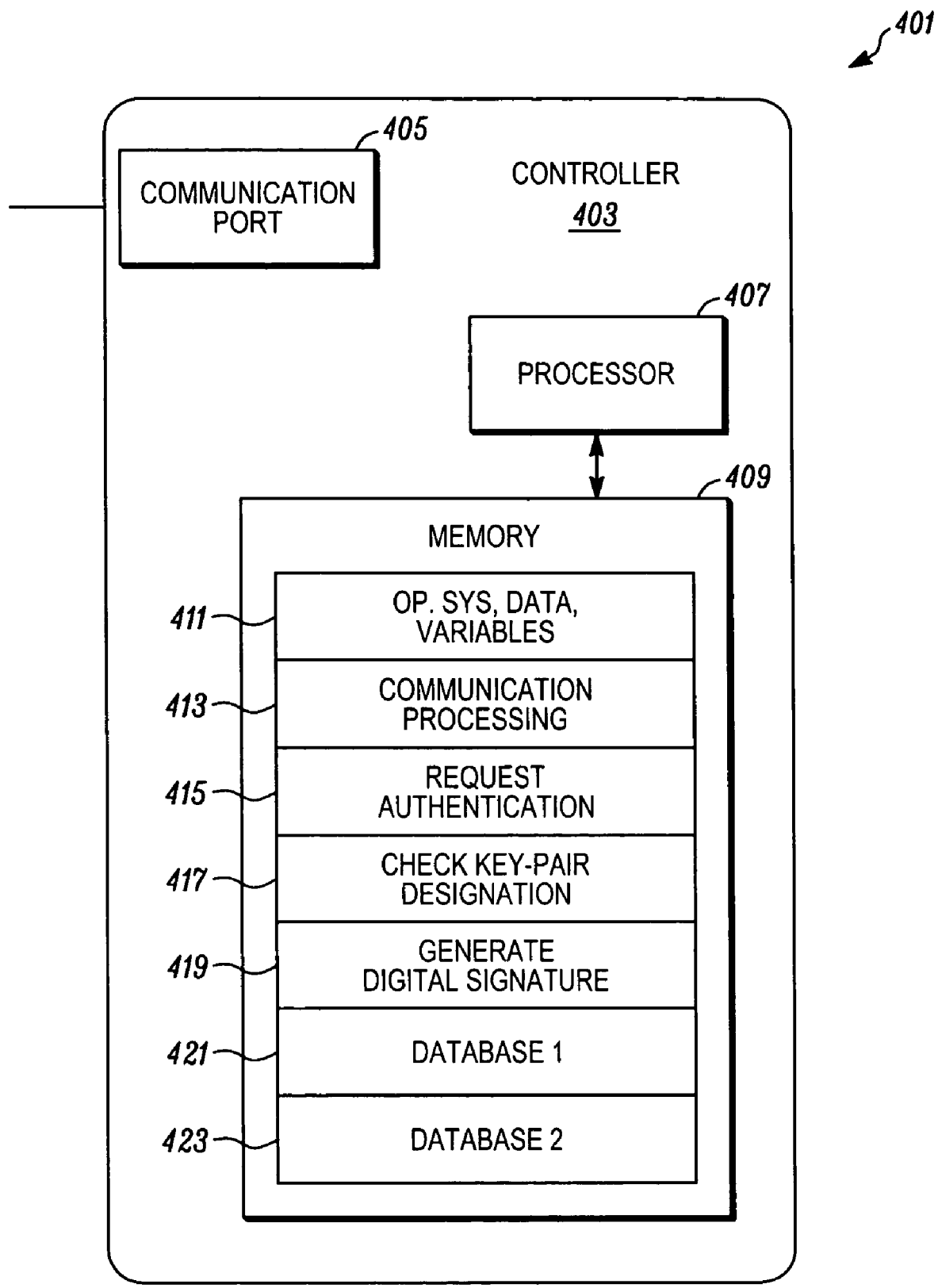
FIG. 4 is a block diagram illustrating portions of an exemplary back end server in accordance with various exemplary embodiments.

Referring now to FIG. 4, a block diagram illustrating portions of an exemplary back end server in accordance with various exemplary embodiments will now be discussed and described. The back end server 401 may include one or more controllers 403. A controller 403 can include a communication port 405 for communication over a communication network, a processor 407, and a memory 409. Other components may be provided as will be understood by one of skill and are hence not described herein. If desired, the communication port 405 can be provided over a secure communication network, e.g., to provide a more secure connection to the front end server.

The processor 407 may comprise one or more microprocessors and/or one or more digital signal processors. The memory 409 will be coupled to the processor 407 and may comprise a read-only memory (ROM), a random-access memory (RAM), a programmable ROM (PROM), an electrically erasable read-only memory (EEPROM), magnetic memory, and/or the like. The memory 409 may include multiple memory locations for storing, among others, an operating system, data and variables 411 for programs executed by the processor 407; computer programs for causing the processor to operate in connection with various functions such as communication processing 413, request authentication 415, checking the key pair designation 417, generating the digital signature 419, and/or other processing; a database 421 of various information such as key pairs; and a database 423 for other information used by the processor 407. The computer programs direct the processor 407 in controlling the operation of the controller 403.

Responsive to signaling, e.g., in accordance with instructions stored in memory 409, or automatically upon receipt of certain information via the communication port 405, the processor 407 may direct/process the received information. For example, the processor 407 can be configured to facilitate receiving a request for a digital signature, the request including a representation of digital information to be used in determining the digital signature, and a designation of at least one key pair to be applied to the digital information. The processor 407 can provide some amount of authentication or other verification. For example, the processor 407 can provide, responsive to the request, first determining whether a requestor corresponding to the request is authentic; and/or second determining whether the key pair designation corresponds to the requester. The processor 407 can have access to a list of authentic requestors (i.e., a user group that owns a particular key pair), and designations of permitted key pairs corresponding to potential requestors. The identity of the requestor can be indicated in the request, the requestor corresponding to an indication of one of the predetermined front end identifiers associated with permitted requestors of digital signatures. The processor 407 can be configured to facilitate maintaining a list of transmitters and key pairs including the at least one key pair, wherein the first determining references the list.

In addition, the processor 407 can further be configured to facilitate, responsive to the first and second determining, generating the digital signature based on the digital information and the at least one key pair. The digital signature can be generated for the digital information that is provided in accordance with known techniques, based on the key pair designation that is provided. Hence, no further discussion of the actual digital signature generation is provided herein.

In accordance with various embodiments, the digital signature can be generated for digital information that is to be sent to, e.g., a particular communication unit, or to numerous communication units. Therefore, the representation can be associated with information corresponding to a particular communication unit, and the key pair(s) can be associated with the particular communication unit. Alternatively, the representation can be associated with information corresponding to multiple communication units, and the key pair(s) can be associated with the multiple communication units.

Although the digital information with digital signature that is generated may be intended for, e.g., restricted distribution or mass production, the processor 407 does not need to distinguish between the types of signatures for this purpose, as the distinction between these types can be triggered by a particular key pair that is provided to the processor 407.

Moreover, the processor 407 can be further configured to facilitate not generating the digital signature, responsive to a failure of one or more of the first and second determining process.

Once the digital signature is determined, the processor 407 can transmit the digital signature, with or without the digital representation as is prescribed, e.g., via the communication port 401, to the requestor (e.g., the front end server). Therefore, the processor 407 can be further configured to transmit the digital signature to the requestor.

Figure 5:
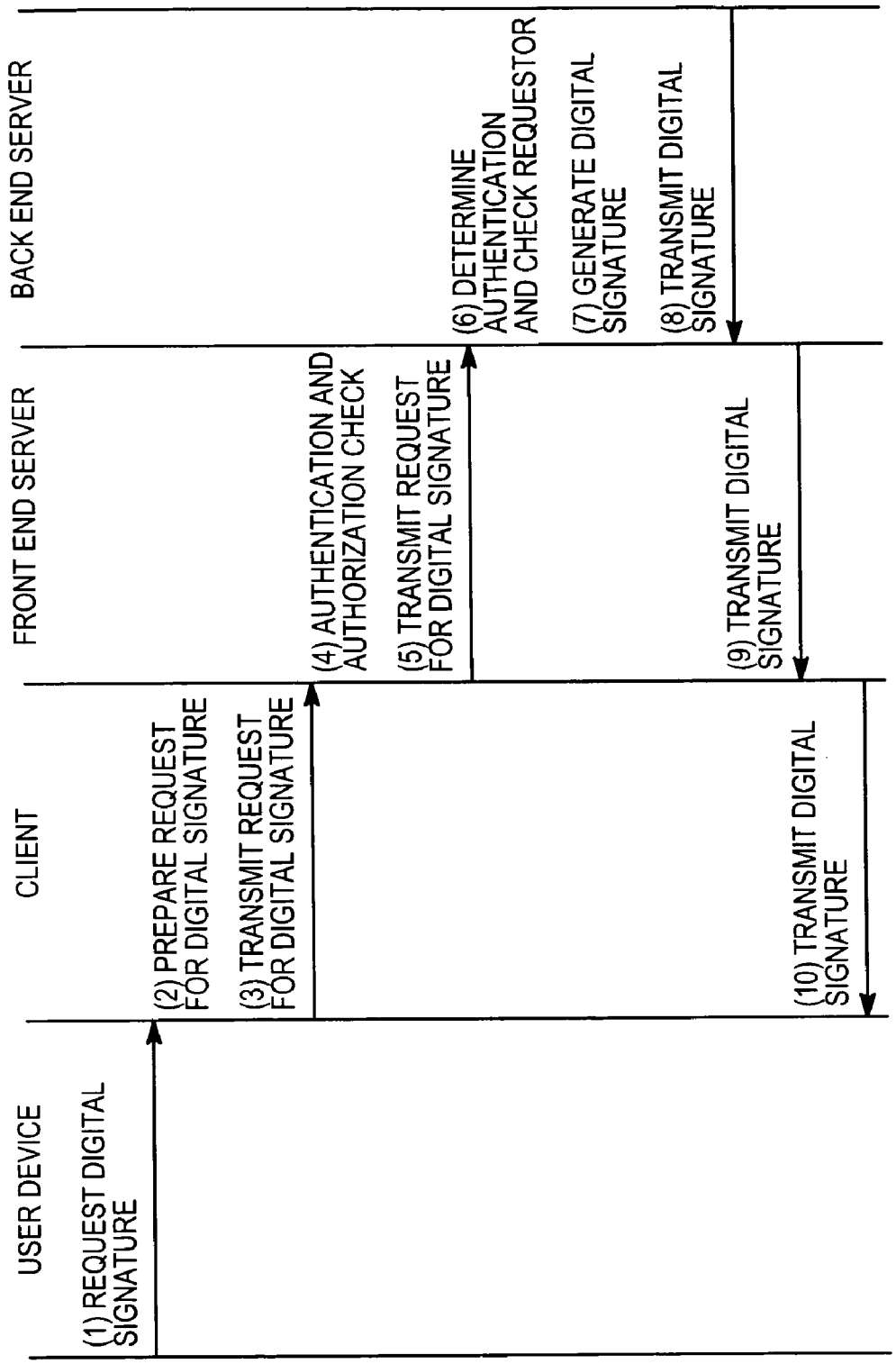
FIG. 5 is a message flow diagram illustrating a request for a digital signature in accordance with one or more embodiments.

Referring to FIG. 5, a message flow diagram illustrating a request for a digital signature in accordance with one or more embodiments will be discussed and described. In accordance with one or more embodiments, the generation of a digital signature is as follows. A user device can transmit 1 a request for a digital signature for particular digital information to a client.

The client can prepare 2 a request for the digital signature. The client can make a digital signature request to a front end server using, for example: the digital information, e.g., software, to be digitally signed (or a cryptographically secure digest thereof); a designation of the signature's key pair; a signature request type; a client identification; and a user identification. In the case of a signature request for restricted distribution software, the signature request can include the distribution information. The client can transmit 3 the request for the digital signature. (The ordering of the information, and the sequence of interactions by which it passes between clients/servers is not essential to this disclosure. There are several well established protocols which are suitable for conveying this kind of information. For example, the user identification may consist of a username and confidential password, while the client identification can be a confidential key used to establish a secure network connection.)

The front end server can perform 4 authentication and authorization checks. For example, the front end server can perform one or more the following checks: authenticate the identity of the client; authenticate the identity of the user; validate the authorization of the client on this front end server; or validate the authorization of the user to make the requested signature request type with the requested key pair. If any of the checks fail, the signature request can be refused. If all of or the appropriate ones of the checks succeed, the front end server can reformat the signature request to, for example, exclude the signature request type, client identification and user identification but include the front end server identity and its designated user group. In the case of a signature request for restricted distribution software, the front end server can bind the distribution information with the digital information in a way which can be recognized by the processor of a communication device later receiving and authenticating the digital information. The front end server can transmit 5 the signature request to the back end server.

The back end server can perform 6 various authentication checks. For example, the following checks can be performed: authenticate the identity of the front end server; and ensure that the front end server's user group owns the key pair to be used. If any check fails, the signature request can be refused. If all of the checks succeed, the back end server can generate 7 the digital signature, e.g., using the key pair subsystem to generate the required digital signature.

The digital signature can be transmitted 8 from the back end server to the front end server, and transmitted 9 from the front end server to the client. The client can reformat the digital signature (if desired) in order to facilitate subsequent authentication of the digital information. If the digital signature was requested from a user device, the client transmits 10 the digital signature to the user device.

Figure 6:
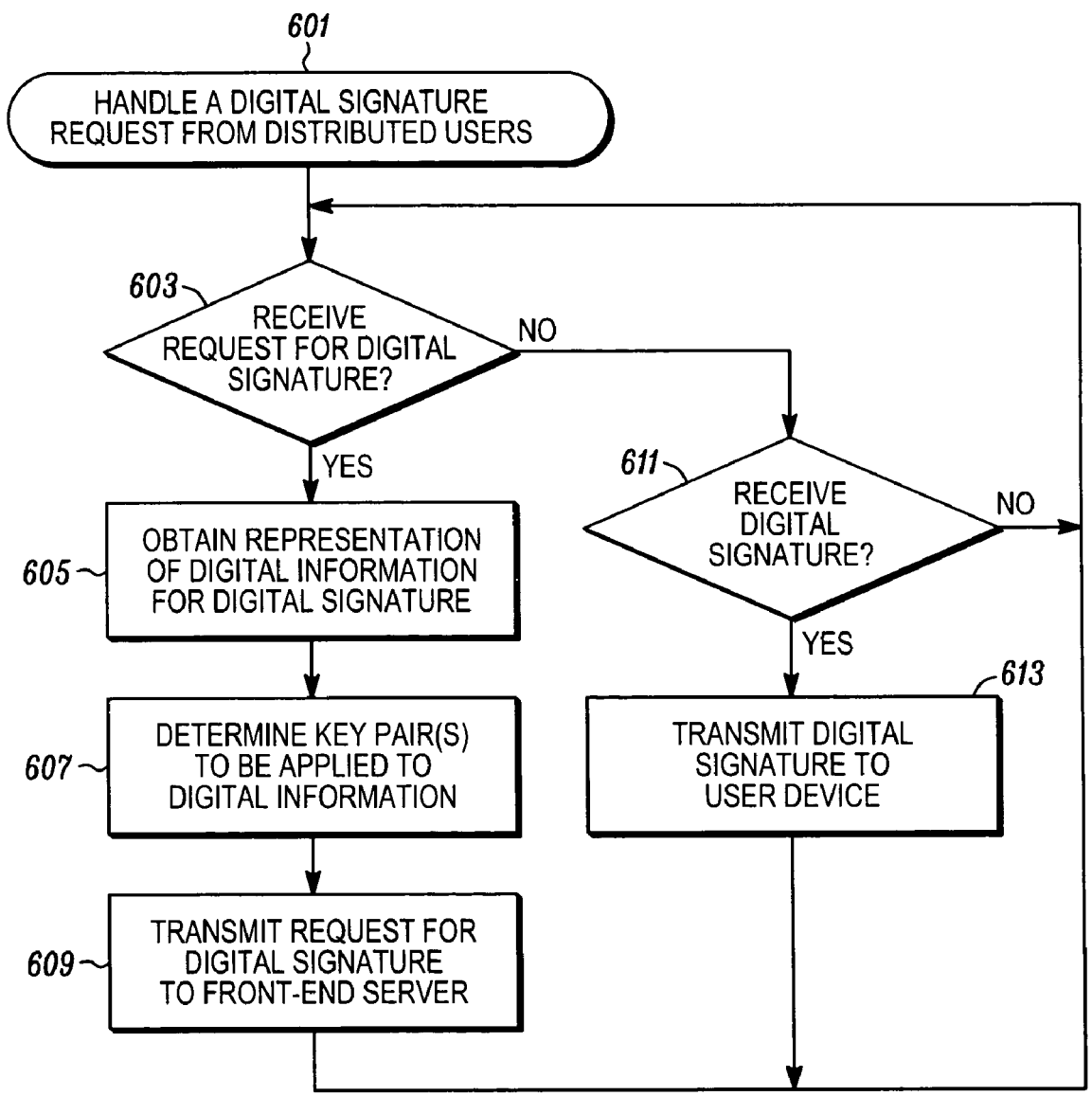
FIG. 6 is a flow chart illustrating an exemplary procedure for handling a digital signature request in accordance with various exemplary and alternative exemplary embodiments.

Referring to FIG. 6, a flow chart illustrating an exemplary procedure for handling a digital signature request in accordance with various exemplary and alternative exemplary embodiments will be discussed and described. The procedure can advantageously be implemented on a client, for example, a processor of a controller, described in connection with FIG. 2 or other apparatus appropriately arranged.

A digital signature request 601 from distributed users can be handled as follows. It can be determined whether a request is received 603 for a digital signature. If such a request is received, then the process can obtain 605 the representation of the digital information to which the digital signature is to be applied. This has been described above in detail. The process 607 can determine one or more key pairs to be applied to the digital information, as described above. The process 609 can transmit the request for the digital signature to, e.g., a front end server. Subsequently, the process 609 can continue looping to check received information.

When there is no request for a digital signature at 603, the process can check 611 whether a digital signature has been received, e.g., from the front end server and if not loop to 603. If so, the process can transmit 613 the digital signature to the user device, or to the entity that requested the digital signature. Subsequently, the process 609 can continue looping to check received information.

Figure 7:
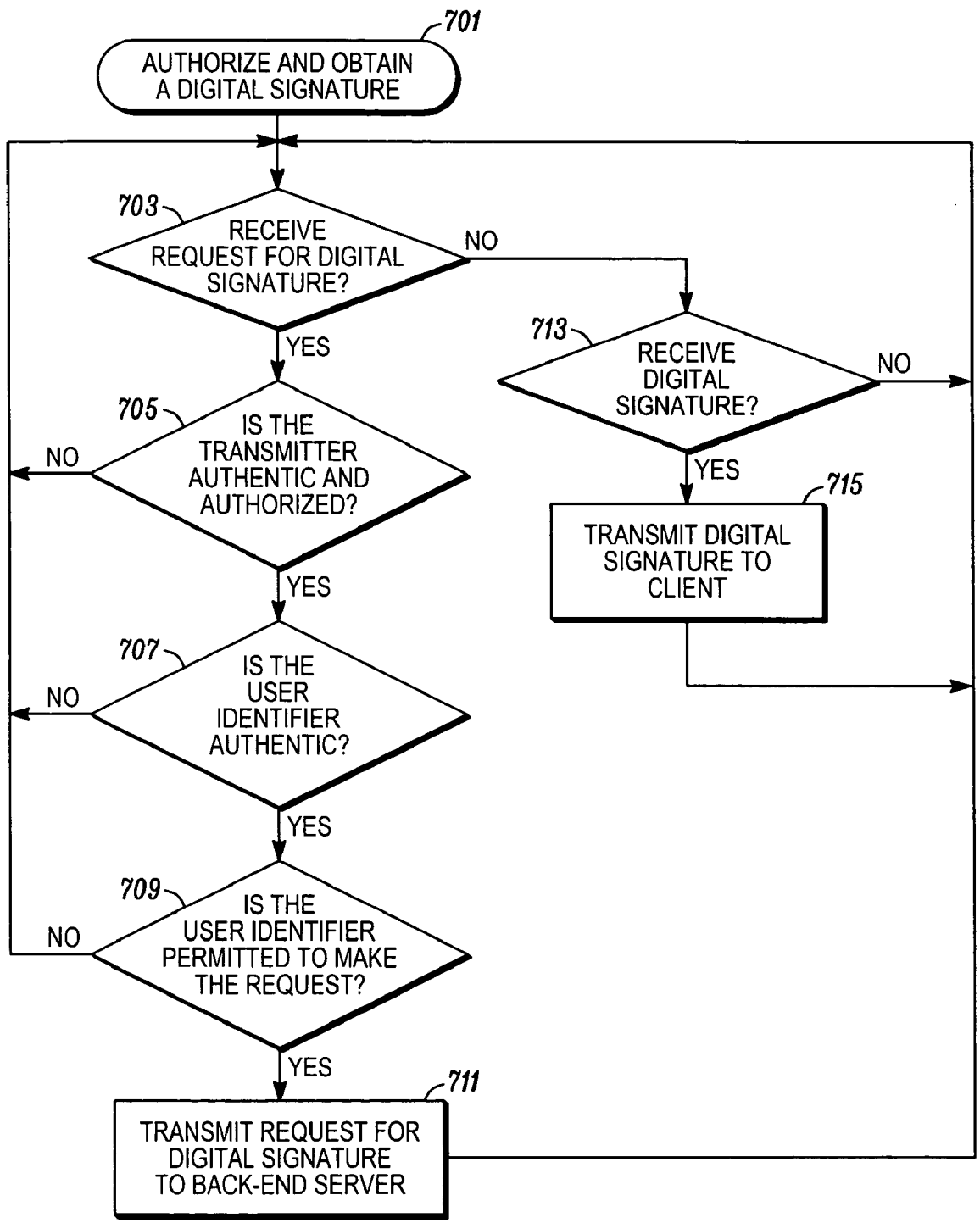
FIG. 7 is a flow chart illustrating an exemplary procedure for authorizing and obtaining a digital signature in accordance with one or more embodiments.

Referring now to FIG. 7, a flow chart illustrating an exemplary procedure for authorizing and obtaining a digital signature in accordance with one or more embodiments will be discussed and described. The procedure can advantageously be implemented on a front end server, for example, a processor of a controller, described in connection with FIG. 3 or other apparatus appropriately arranged.

The procedure for authorizing and obtaining a digital signature 701 can include checking 703 whether a request for a digital signature was received. If so, the process can perform several checks 705, 707, 709 and if any check fails, the process can loop back to check another received request, thereby ignoring the request. (Error processing, logging, and/or alarming can be performed at the appropriate time if desired.) The process can check 705 whether the transmitter is authentic and authorized; can check 707 whether the user identifier is authentic; and/or can check 709 whether the user identifier is permitted to make the request. Each of these checks has been described in detail above. If all of the checks are passed, the process can transmit 711 its request for digital signature to the device that will generate the digital signature, e.g., to the back end server. Having sent the request for the digital signature, the process can loop back to check for another received request.

If the received information is not a request for a digital signature at 703, but rather is a digital signature 713, then the process transmits 715 the digital signature to the client that requested it. If not a digital signature at 713 or after having sent the digital signature, the process can loop back to check for another received request.

Figure 8:
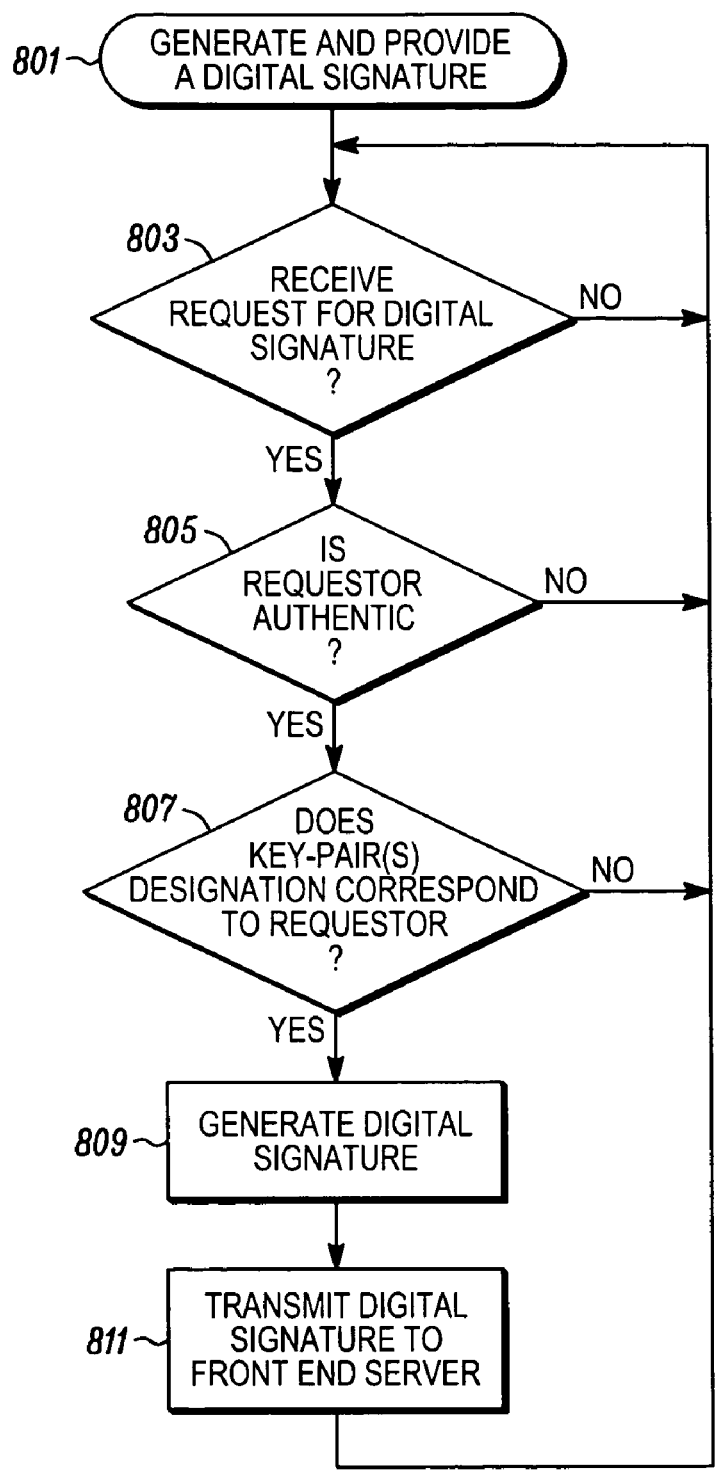
FIG. 8 is a flow chart illustrating an exemplary procedure for generating and providing a digital signature in accordance with one or more embodiments.

Referring now to FIG. 8, a flow chart illustrating an exemplary procedure for generating and providing a digital signature in accordance with one or more embodiments will be discussed and described. The procedure or process can advantageously be implemented on a back end server, for example, a processor of a controller, described in connection with FIG. 4 or other apparatus appropriately arranged. A process for generating 801 and providing a digital signature can include, for example, checking whether a request for a digital signature has been received 803. If so, the process can perform various checks 805, 807; if any check fails, the process can loop back to check for another request for digital signature, thereby not responding to requests that fail.

The process can check 805 whether the requestor is authentic; and can check 807 whether the key pair(s) designation correspond to the requestor, all as previously described in detail above. If all checks are passed, the process can generate 809 a digital signature, based on the key pair designation and corresponding to the digital information. The process can then transmit 811 the digital signature to the front end server. The process can then loop back to check for the next request for a digital signature.

One or more embodiments can provide a solution to a problem of keeping the private keys used to generate a digital signature in a safe environment, both physically and logically, while at the same time providing access to a distributed user base which can use the key pairs to generate digital signatures as required. Conventional systems allow a private key to be generated and then used on a single computer, but the private key can be made available to a distributed user base by an insecure or unsecured (and hence, undesirable) practice of providing copies of the key to each user. The client/server architecture used here can permit users and/or user groups to share private keys but with adequate security.

Another problem of sharing secure storage of private keys between different groups without allowing them to generate digital signatures for each other's software or files can be resolved by the back end server keeping track of key pair ownership, and with the front end servers corresponding to groups. A user from outside a particular group owning a particular key pair can be permitted to make a digital signature request if there is a matching entry in the access control list on the front end server corresponding to the group owning the key pair.

In addition, a control on mass production software can be maintained while permitting a broad set of users to digitally sign restricted distribution software, utilizing, e.g., the user authorization check on the front end server. As described above, one or more embodiments provide that mass production software can be digitally signed where there is an explicit matching entry for the user and the key pair in the access control list on the front end server. On the other hand, digitally signing restricted distribution software can be permitted for every user in the user group owning the key pair, without the need for an access control list entry, if desired. Furthermore, users from other user groups may be given permission to digitally sign restricted distribution software by adding an entry to the access control list.

One or more embodiments can be used in connection with, for example, secure technology implemented on communication devices, as well as processors utilized in connection with other types of devices not limited to the communication industry. Moreover, one or more embodiments can be utilized in connection with various public key infrastructure tools and digital signature services.

Much of the inventive functionality and many of the inventive principles when implemented, are best supported with or in software or integrated circuits (ICs), such as a digital signal processor and software therefore or application specific ICs. Where appropriate, the processor can be, for example, a general purpose computer, can be a specially programmed special purpose computer, can include a distributed computer system, and/or can include embedded systems. Similarly, where appropriate, the processing could be controlled by software instructions on one or more computer systems or processors, or could be partially or wholly implemented in hardware. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, discussion of such software and ICs, if any, was limited to the essentials with respect to the principles and concepts used by the preferred embodiments.

It should be noted that the term communication unit may be used interchangeably herein with subscriber unit, wireless subscriber unit, wireless subscriber device or the like. Examples of such units include personal digital assistants, personal assignment pads, and personal computers equipped for wireless operation, a cellular handset or device, or equivalents thereof.

Processors of particular interest may include a general purpose computer, or a specially programmed special purpose computer. A user may interact with the system via e.g., a personal computer or over PDA, e.g., the Internet, an intranet, etc. One or more embodiments may include a distributed computer system rather than a single computer. Similarly, one or more communications links may be a dedicated link, a modem over a POTS line, and/or other methods of communicating between computers and/or users. Moreover, the processing could be controlled by a software program on one or more computer systems or processors, or could even be partially or wholly implemented in hardware. The system used in connection with one or more embodiments may rely on the integration of various components including, as appropriate and/or if desired, hardware and software servers, database engines, and/or other content providers.

One or more embodiments is optionally suitably equipped with a multitude or combination of processors or storage devices. For example, the processor may be replaced by, or combined with, any suitable processing system operative in accordance with the principles of embodiments discussed above, including sophisticated calculators, hand held, laptop/notebook, mini, mainframe and super computers, as well as processing system network combinations of the same. Further, portions of one or more embodiments in computer instruction form may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in one or more embodiments. For example, at least some of the functionality mentioned above could be implemented using Visual Basic, C, C++ or any assembly language appropriate in view of the processor being used. It could also be written in an interpretive environment such as Java.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A server comprising:
    a memory;
    a communication port; and
    a processor coupled to the memory and the communication port, the processor being configured to facilitate, responsive to a first request for a digital signature to be applied to digital information, the first request including a user identifier:
        obtaining a representation of the digital information to be used in determining the digital signature;
        determining a designation of at least one key pair to be applied to the digital information, wherein the at least one key pair corresponds to a group of users; and
        transmitting, cooperatively with the communication port, a second request for a digital signature including the representation, the designation of at least one key pair, one of a plurality of types of digital signature, and the user identifier.

2. The server of claim 1, wherein the processor is further configured to facilitate determining, responsive to the at least one key pair, a recipient of the second request, wherein the transmitting further comprises transmitting the second request to the recipient.

3. The server of claim 2, wherein the processor is configured to facilitate operably coupling to the recipient, and authenticating itself to the recipient.

4. The server of claim 1, wherein the second request indicates at least a first digital signature type corresponding to a particular device, and the second request includes an identification corresponding to the particular device.

5. The server of claim 1, wherein the second request indicates at least a second digital signature type corresponding to a plurality of devices.

6. A method of facilitating a digital signature, the method comprising:
    receiving, at a server, a first request for a digital signature, the first request including a user identifier, a representation of digital information to be used in determining the digital signature, and a designation of at least one key pair to be applied to the digital information, wherein the at least one key pair corresponds to a group of users;
    responsive to the first request, first determining whether a transmitter device of the first request is authentic and whether the transmitter device is authorized to send the first request; second determining whether the user identifier is authentic; third determining whether the user identifier is permitted to make the first request; and
    responsive to the first, second and third determining, transmitting a second request to a device for generating a digital signature, the request including the representation of the digital information and the designation of at least one key pair.

7. The method of claim 6, wherein the receiving the first request including a user identifier further includes receiving one of a plurality of user identifiers permitted to make the request.

8. The method of claim 6, wherein the receiving the first request further comprises receiving a first request for at least a second digital signature type corresponding to a plurality of devices.

9. The method of claim 6, wherein the receiving the first request including a user identifier further includes receiving one of a plurality of pre-determined client identifiers associated with permitted requestors of digital signatures.

10. The method of claim 6, further comprising not transmitting the second request, responsive to a failure of at least one of the first, second and third determining.

11. The method of claim 6, further comprising maintaining a list of corresponding user identifiers including the user identifier and key pairs including the at least one key pair, wherein at least one of the first, second and third determining utilizes the list.

12. The method of claim 6, wherein the transmitting and the receiving further comprise transmitting and receiving messages when operably coupled to a communication network in accordance with a secure connection.

13. The method of claim 6, wherein the transmitting further comprises transmitting the second request when operably coupled to the device.

14. A server, comprising:
a memory;
a communication port; and
a processor coupled to the memory and the communication port, the processor configured to facilitate;
receiving, cooperatively with the communication port, a request for a digital signature, the request including a representation of digital information to be used in determining the digital signature, one of a plurality of types of digital signature, and a designation of at least one key pair to be applied to the digital information, wherein the at least one key pair corresponds to a group of users;
responsive to the request, first determining whether a requestor corresponding to the request is authentic;
second determining whether the designation corresponds to the requestor; and
responsive to the first and second determining, generating the digital signature based on the digital information, the one of a plurality of types of digital signature, and the at least one key pair.

15. The server of claim 14, wherein the representation is associated with information corresponding to a particular communication unit, and wherein the at least one key pair is associated with the particular communication unit.

16. The server of claim 14, wherein the representation is associated with information corresponding to a plurality of communication units, and wherein the at least one key pair is associated with the plurality of communication units.

17. The server of claim 14, wherein the requestor is indicated in the request, the requestor corresponding to an indication of one of a plurality of pre-determined front end identifiers associated with permitted requestors of digital signatures.

18. The server of claim 14, wherein the processor is further configured to facilitate not generating the digital signature, responsive to a failure of at least one of the first and second determining.

19. The server of claim 14, wherein the processor is further configured to facilitate maintaining a list of transmitters and key pairs including the at least one key pair, wherein the first determining references the list.

20. The server of claim 14, wherein the processor cooperatively with the communication port is further configured to transmit the digital signature to the requestor.

* * * * *